United States Patent [19]

Sato et al.

[11] Patent Number: 5,292,536
[45] Date of Patent: Mar. 8, 1994

[54] SUGAR-COATED ARTICLE

[75] Inventors: Makoto Sato; Yukio Tsuchiya, both of Saitama; Masaki Shibata, Tokyo; Toshinobu Tsurumi; Sadanori Tanaka, both of Saitama, all of Japan

[73] Assignee: Lotte Company Limited, Tokyo, Japan

[21] Appl. No.: 868,503

[22] Filed: Apr. 15, 1992

[30] Foreign Application Priority Data

Apr. 17, 1991 [JP] Japan ................. 3-85405

[51] Int. Cl.$^5$ ................. A23G 3/30
[52] U.S. Cl. ................. 426/5; 426/660; 426/302; 426/102; 426/103
[58] Field of Search ............ 426/5, 102, 103, 302, 426/660

[56] References Cited

U.S. PATENT DOCUMENTS

| | | | |
|---|---|---|---|
| 4,681,766 | 7/1987 | Huzinec et al. | 426/103 |
| 4,792,453 | 12/1988 | Reed et al. | 426/5 |
| 4,911,937 | 3/1990 | Crosello et al. | 426/103 |
| 5,087,460 | 2/1992 | Cherukuri et al. | 426/5 |
| 5,135,761 | 8/1992 | Dave et al. | 426/5 |

OTHER PUBLICATIONS

I. Takazoe et al., "Palatinose—a sucrose substitute", Swedish Dental Journal 9 (1985), pp. 81–87.

Japan Sugar Yearbook, 1988, pp. 10–13, Mitsui & Co., Ltd.

H. de Groot, "Neue Zuckeraustauschstoffe: Informationen und Materialien fur den Unterricht", Ernahrungslehre und- Praxis 3, Mar., 1991, pp. B9–12.

*Primary Examiner*—Jeanette Hunter
*Attorney, Agent, or Firm*—Young & Thompson

[57] ABSTRACT

A sugar-coated article having palatinose used as a coating material for a sugar-coating layer of the sugar-coated article, whereby the article having an extremely soft initial biting mouth-feel is formed. A content of palatinose in the coating material in the sugar-coating layer is 25 to 100%.

4 Claims, No Drawings

SUGAR-COATED ARTICLE

FIELD OF THE INVENTION

The present invention relates to a sugar-coated article having a soft initial biting mouth-feel, in particular, relates to a novel sugar-coated article which gives a soft texture especially in initial biting in the mouth and gives no gritty texture.

BACKGROUND OF THE INVENTION

Sugar-coated articles are generally produced such that with respect to materials subjected to sugar-coating (center materials) such as chewing gum, gum jelly, chocolate, candy, fruits, tablet confectionery, nuts, biscuit and the like, an about 50% aqueous solution syrup comprising sugar, binding agents such as gelatin or the like and optionally a coloring agent is used, and the material subjected to sugar-coating placed in a rotary pan is supplied with the aqueous solution syrup, so as to form a sugar-coating with sending air and drying. The sugar-coating formation step usually comprises a plurality of steps, in which the content of stabilizer is occasionally reduced stepwise to use an aqueous solution comprising only sugar for the outermost layer so as to form a sugar-coating having a fine texture. Each of the steps is called lower-coating, intermediate-coating and upper-coating. In addition, when the attention is essentially given to the hardness or softness of the sugar coating, there is the classification into two types of soft application and hard application.

Conventionally, for sugar-coating layers of ordinary sugar-coated article, a sweetener such as sorbitol or the like was used, however, such a sugar-coated article has a bad initial biting mouth-feel and had a strong gritty nature.

SUMMARY OF THE INVENTION

It is an object of the present invention to provide a sugar-coated article having a soft initial biting mouth-feel being as a novel sugar-coated article which gives a soft texture during chewing especially in the initial biting in the mouth with giving no gritty texture by using a material which has not been hitherto used as a sugar-coating layer of sugar-coated articles so as to produce the sugar-coated article.

According to the present invention, there is provided a sugar-coated article wherein palatinose is used as a coating material to be used for a sugar-coating layer of the sugar-coated article, whereby the sugar-coated article having an extremely soft initial biting mouth-feel is formed.

PREFERRED EMBODIMENT OF THE INVENTION

The sugar-coated article according to the present invention can be preferably produced as follows.

As a center material, chewing gum, gum jelly, chocolate, candy, fruits, tablet confectionery, nuts, biscuit and the like are finely cut into a predetermined size followed by introduction into an ordinary pan for sugar-coating, and a palatinose syrup prepared beforehand is applied.

The palatinose syrup is obtained by blending in a blending ratio of 50 to 80%, 0 to 5% and 15 to 50% of palatinose, a binding agent such as gelatin or the like and water as raw materials, respectively.

When the liquid of the syrup enters into the whole center gum, drying is conducted at a temperature of 15° to 30° C. and a humidity of 30 to 65% with sending air. By repeating this operation, the sugar-coating layer is allowed to form up to 20 to 70% by extra weight as a sugar-coating layer with respect to the center gum.

Next, a palatinose syrup added with a coloring matter beforehand is applied.

The palatinose syrup added with the coloring matter uses palatinose, a thickener such as gelatine or the like, a coloring matter as the coloring agent and water as raw materials, in which each of them is blended in a blending ratio or 50 to 80%, 0 to 5%, 0.01 to 1% and 15 to 50%. Such a syrup may be optionally added with a flavor.

When the syrup entirely enters, sending air is performed to dry, and by repeating this operation, color application is conducted to give 5 to 20% by extra weight with respect to the center gum as a color application layer.

After taking out from the pan to sufficiently dry for one night and day, a predetermined amount of the color-applied product is again introduced into a pan exclusively used for gloss formation, and during rotation, for example, 0.01 to 0.1% by extra weight of carnauba wax powder is applied, and rotation is continued in that state for about 5 to 20 minutes so as to give a final product.

In the present invention, palatinose can be mixed with other sugars to use, however, if palatinose becomes not more than 25% as the coating material of the sugar-coating layer at the time after taking out to give the product, there is given a tendency that a somewhat gritty nature appears, so that it is desirable that the palatinose ratio in the coating material in the sugar-coating layer is 25% to 100%, and a higher palatinose ratio is preferable.

In addition, with respect to the sugar-coated article according to the present invention, it is preferable that organic acid is further added to the sugar-coating layer or the center material of the sugar-coated article. This makes it possible to obtain a sugar-coated article having an acid taste with the soft initial biting mouth-feel.

The present invention will be further explained in detail hereinafter with reference to examples, however, the present invention is not limited to the following examples only.

EXAMPLE 1

Chewing gum was used as the center material, and palatinose was used as the coating material so as to produce a sugar-coated article (hard coating application).

30 kg of center gum was introduced into an ordinary pan for sugar-coating, 200 g of previously prepared palatinose syrup (palatinose, gelatin and water were used as raw materials, which were blended in a blending ratio of 54.0%, 0.6% and 45.4%, respectively) was applied, and when the liquid of the syrup entered into the whole center gum, drying was carried out at a temperature of 20° C. and a humidity of 57% with sending air by 4.2 m/sec. By repeating this operation, a sugar-coating layer was allowed to form up to 30% by extra weight as the sugar-coating layer with respect to the center gum. Next, 200 g of palatinose syrup added with a flavor beforehand was applied, and when the syrup entirely entered, air was sent to dry, and this operation was repeated three times. Next, 200 g of the palatinose syrup was applied again, and when the syrup entirely entered, air was sent to dry, and by repeating this operation, a sugar-coating layer was allowed to form up to 55% by extra weight as the sugar-coating layer with respect to the center gum.

Next, 200 g of palatinose syrup added with a coloring matter beforehand (palatinose, gelatin, a gardenia coloring matter and water were used as raw materials, and each of them was blended in a blending ratio of 53.8%, 0.5%, 0.3% and 45.4%) was applied, and when the syrup entirely entered, air was sent to dry, and by repeating this operation, color application was performed up to 3% by extra weight with respect to the center gum as a color application layer.

After taking out from the pan to sufficiently dry for one night and day, about 45 kg of color-applied product was again introduced into the pan exclusively used for gloss formation, and 0.1% by extra weight of carnauba wax powder was applied during rotation, and the rotation was continued in that state for about 15 minutes to give a final product.

Incidentally, when palatinose was not more than 25% as the coating material of the sugar-coating layer after the taking out to give the product, there was a tendency of providing a somewhat gritty nature, so that it has been found out that the palatinose ratio in the coating material in the sugar-coating layer is desirably 25% to 100%, and a higher palatinose ratio is preferable.

The sugar-coated article obtained as described above had a soft initial biting mouth-feel with no or little gritty nature.

Results of measurement of the hardness of the initial biting mouth-feel using a rheometer are as follows. Namely, measurement values of hardness with the penetrometer in the case of chewing gum of the ordinary type with the ordinary sugar coating were 112.67 to 126.67 kg/cm$^2$, whereas measurement values of the sugar-coated article according to the present invention were 79.57 to 90.07 kg/cm$^2$, from which it can be understood that the sugar-coated article according to the present invention becomes to have a remarkably soft initial biting mouth-feel as compared with the ordinary sugar-coated article.

EXAMPLE 2

Example of Soft Coating Application 30 kg of center gum was introduced into an ordinary pan for sugar-coating, 200 g of palatinose syrup prepared beforehand was applied, and when the liquid of the syrup entered into the whole center gum, 200 g of ground palatinose was sprinkled by dividing into three times. By repeating this operation, a sugar-coating layer was allowed to form up to 30% by extra weight with respect to the center gum as the sugar-coating layer. Next, 200 g of palatinose syrup added with a flavor beforehand was applied, and when the syrup entirely entered, 200 g of ground palatinose was sprinkled by dividing into three times, and this operation was repeated three time. Next, 200 g of palatinose syrup was again applied, and when the syrup entirely entered, 200 g of ground palatinose was sprinkled by dividing into three times. By repeating this operation, a sugar-coating layer was allowed to form up to 55% by extra weight with respect to the center gum as the sugar-coating layer.

Next, 200 g of palatinose syrup added with a coloring matter beforehand (palatinose, gelatin, a gardenia coloring agent and water were used as raw materials, and each of them was blended in a blending ratio of 53.8%, 0.5%, 0.3% and 45.4%) was applied, and when the syrup entirely entered, air was sent to dry, and by repeating this operation, color application was performed up to 3% by extra weight with respect to the center gum as a color application layer.

After taking out from the pan to sufficiently dry for one night and day, about 45 kg of the color-applied product was again introduced into a pan exclusively used for gloss formation, and 0.1% by extra weight of carnauba wax powder was applied during rotation, and the rotation was continued in that state for about 15 minutes to give a final product.

The obtained sugar-coated article had a soft initial biting mouth-feel with no or little gritty nature.

EXAMPLE 3

A Case in which Acid was Added to the Center Gum

Chewing gum in which 2.0% of organic acid such as citric acid or the like was added was used as the center material, and palatinose was used as the coating material, and a sugar-coated article of chewing gum containing acid was produced by means of the same method as Example 1.

The obtained sugar-coated article had a soft initial biting mouth-feel with no or little gritty nature.

EXAMPLE 4

A Case in which Acid was Added to the Sugar-Coating Layer

Chewing gum was used as the center material, and palatinose was used as the coating material, and a sugar-coated article of chewing gum was produced by means of the same method as Example 2. In that case, a part of ground palatinose to be used for the application of powder was replaced by organic acid such as citric acid or the like, and the application of sugar-coating was performed such that the organic acid to be used was 2.0% by extra weight with respect to the center gum.

The obtained sugar-coated article had a soft initial biting mouth-feel with no or little gritty nature.

EXAMPLE 5

Gum jelly was used as the center material, and palatinose was used as the coating material, and a sugar-coated article of gum jelly was produced in the same method as Example 1.

The obtained sugar-coated article had a soft initial biting mouth-feel with no or little gritty nature.

EXAMPLE 6

Marble chocolate was used as the center material, and palatinose was used as the coating material, and a sugar-coated article of chocolate was produced in the same method as Example 1.

The obtained sugar-coated article had a soft initial biting mouth-feel with no or little gritty nature.

EXAMPLE 7

Soft candy was used as the center material, and palatinose was used as the coating material, and a sugar-coated article of candy was produced in the same method as Example 1.

The obtained sugar-coated article had a soft initial biting mouth-feel with no or little gritty nature.

EXAMPLE 8

Raisin was used as the center material, and palatinose was used as the coating material, and a sugar-coated article of fruits was produced in the same method as Example 1.

The obtained sugar-coated article had a soft initial biting mouth-feel with no or little gritty nature.

EXAMPLE 9

Soft tablet confectionery was used as the center material, and palatinose was used as the coating material, and a sugar-coated article of tablet confectionery was produced in the same method as Example 1.

The obtained sugar-coated article had a soft initial biting mouth-feel with no or little gritty nature.

EXAMPLE 10

Almond was used as the center material, and palatinose was used as the coating material, and a sugar-coated article of nuts was produced in the same method as Example 1.

The obtained sugar-coated article had a soft initial biting mouth-feel with no or little gritty nature.

EXAMPLE 11

Soft biscuit was used as the center material, and palatinose was used as the coating material, and a sugar-coated article of biscuit was produced in the same method as Example 1.

The obtained sugar-coated article had a soft initial biting mouth-feel with no or little gritty nature.

EXAMPLE 12

Panelist test of the sugar-coated article according to the present invention was carried out.

Sugar-coated articles of chewing gum having ratios as shown in Table 1 were prepared, and the sensory test was carried out by 10 professional panelists. Results are shown in Table 1.

TABLE 1

| Sugar (%) | Palatinose (%) | Sensory test result |
|---|---|---|
| 100 | 0 | 11 |
| 75 | 25 | 32 |
| 50 | 50 | 34 |
| 25 | 75 | 38 |
| 0 | 100 | 40 |

Incidentally, with respect to the evaluation standard, as the degree of hardness standard of the initial biting mouth-feel, there were given 1 point (hard), 2 points (fairly hard), 3 points (fairly soft) and 4 points (soft).

As described above, according to the present invention, there is provided a sugar-coated article having a soft initial biting mouth-feel being as a novel sugar-coated article which gives a soft texture during chewing especially in the initial biting in the mouth with giving no gritty texture by using palatinose which has not been hitherto used as a sugar-coating layer of sugar-coated articles so as to produce the sugar-coated article.

What is claimed is:

1. A sugar-coated confection comprising an edible center material and a layer coating said edible center material, wherein said layer comprises at least 25% by weight palatinose.

2. A sugar-coated confection according to claim 1, wherein said edible center material or said coating layer comprises an organic acid.

3. A sugar-coated confection according to claim 1, wherein said coating layer is present in a ratio to said center material of 20 to 70% by weight.

4. A sugar-coated confection according to claim 2, wherein said organic acid is present in said edible center material or said coating layer in an amount of about 2% by weight of said edible center material.

* * * * *